US007714706B2

(12) United States Patent
Ostertag et al.

(10) Patent No.: US 7,714,706 B2
(45) Date of Patent: May 11, 2010

(54) LINKING OF A SENSOR ELEMENT WITH A TRANSPONDER

(75) Inventors: Thomas Ostertag, Isardamm 121 b, 82515 Geretsried (DE); Walter Schacherbauer, Gilgenberg (AT)

(73) Assignee: Thomas Ostertag, Gerestried (DE)

( * ) Notice: Subject to any disclaimer, the term of this patent is extended or adjusted under 35 U.S.C. 154(b) by 541 days.

(21) Appl. No.: 10/536,429

(22) PCT Filed: Nov. 13, 2003

(86) PCT No.: PCT/EP03/12702

§ 371 (c)(1),
(2), (4) Date: Apr. 27, 2006

(87) PCT Pub. No.: WO2004/049280

PCT Pub. Date: Jun. 10, 2004

(65) Prior Publication Data

US 2006/0186997 A1 Aug. 24, 2006

(30) Foreign Application Priority Data

Nov. 26, 2002 (DE) ................................ 102 55 139

(51) Int. Cl.
*B60C 23/00* (2006.01)

(52) U.S. Cl. ........................ 340/445; 340/448; 340/531

(58) Field of Classification Search ................. 340/442, 340/445, 447, 448, 531, 657
See application file for complete search history.

(56) References Cited

U.S. PATENT DOCUMENTS

| | | | | |
|---|---|---|---|---|
| 3,723,966 | A | 3/1973 | Mueller | |
| 5,179,856 | A * | 1/1993 | Huang | 73/725 |
| 5,763,961 | A * | 6/1998 | Dreyer et al. | 307/116 |
| 6,204,764 | B1 * | 3/2001 | Maloney | 340/572.7 |
| 6,369,703 | B1 | 4/2002 | Lill | |
| 6,378,360 | B1 | 4/2002 | Bartels | |
| 2001/0008083 | A1 | 7/2001 | Brown | |

FOREIGN PATENT DOCUMENTS

| | | |
|---|---|---|
| DE | 4033053 | 10/1990 |
| DE | 4411478 | 3/1996 |
| DE | 60002557 | 2/2000 |
| JP | 51-25153 | 7/1976 |
| JP | 4-34797 | 2/1992 |
| WO | 0112452 A1 | 2/2001 |

* cited by examiner

*Primary Examiner*—Thomas J Mullen
(74) *Attorney, Agent, or Firm*—Baker & Hostetler LLP

(57) ABSTRACT

The invention relates to the coupling of a sensor element to a transponder, the connection of said sensor element to the transponder being achieved by capacitive or inductive coupling. This enables any separation layer that may lie between the sensor element and the transponder to be retained, allowing the invention to be advantageously used in gas and liquid-tight containers, such as tires. In addition, electrically non-conductive materials of the object to be measured can be used as a dielectric for the capacitive coupling and electrically conductive parts can form part of a conductor loop for the inductive coupling.

16 Claims, 1 Drawing Sheet

LINKING OF A SENSOR ELEMENT WITH A TRANSPONDER

BACKGROUND OF THE INVENTION

The invention relates to linking a sensor element with a transponder.

The wireless interrogation of the relevant electrical parameters of a transponder by means of a suitable reading device is a basic function of radio sensor technology. The information about the physical parameters to be measured is impressed on the interrogated electrical parameters.

In various fields of application in which contactless measuring sensors are used, the location at which the measurements are taken (by one or more sensor elements) does not coincide with the proper transponder position for radio interrogation by the read device. In this case, the sensor elements are generally wired to the other functional components of the transponder (particularly the elements of the transponder which are connected to the read device by radio).

In many applications, the sensor element cannot be wired directly to the transponder without interfering with the function of the equipment being monitored owing to a separating wall, membrane, coating, or similar feature, between the transponder and the sensor, which would have to be penetrated and therefore damaged.

BRIEF SUMMARY OF THE INVENTION

The object of the invention is to provide a link of the type described above which does not interfere with the function of the equipment being monitored.

This object is achieved both by realizing the link between the sensor element and the transponder by means of capacitive coupling, and by realizing the link between the sensor element and the transponder by means of inductive coupling.

Advantage is gained particularly through the use of a capacitor as the sensor element, whose value depends on the respective measurement. Alternatively, it can also be advantageous when an inductor or ohmic resistor whose value depends on the respective measurement is used as the sensor element.

In applications having to do with measuring the thickness of a hollow body, or in which the mechanical stability of the body cannot be interfered with, a preferred development of the invention provides for the link between the sensor element and the transponder to be realized without mechanical penetration, either complete or partial, of a separating layer between the transponder and the sensor element. Typical examples of such applications include automobile or airplane tires, henceforth simply tires.

An advantageous development of the invention provides that at least the sensor element or the transponder is disposed on opposite sides of a separating layer. An alternative which is well suited to many applications provides that one of these elements is preferably disposed either at the surface or in the interior of the separating layers.

A preferred application of the invention is measurement registration by the sensor elements in an interior space of a container which is filled at least partly with gas or liquid.

When the separating layer consists of electrically insulating material, the capacitive coupling is particularly easy, the dielectric of said coupling being formed at least partly by the mechanical separating layer.

If there is an electrical conductor present in the separating layer, the inductive coupling is particularly easy in that at least part of a conductor loop of said coupling is formed by the existing conductor.

When the invention is used in a steel-belted tire, it is particularly advantageous for the belt to be used as the conductor loop of the inductive coupling.

Additionally or alternatively, it is expedient when a conductor loop is arranged in a tire through vulcanization.

BRIEF DESCRIPTION OF THE DRAWINGS

Exemplifying embodiments of the invention will now be described with reference to the drawing. Shown are.

DETAILED DESCRIPTION

Figure 1:
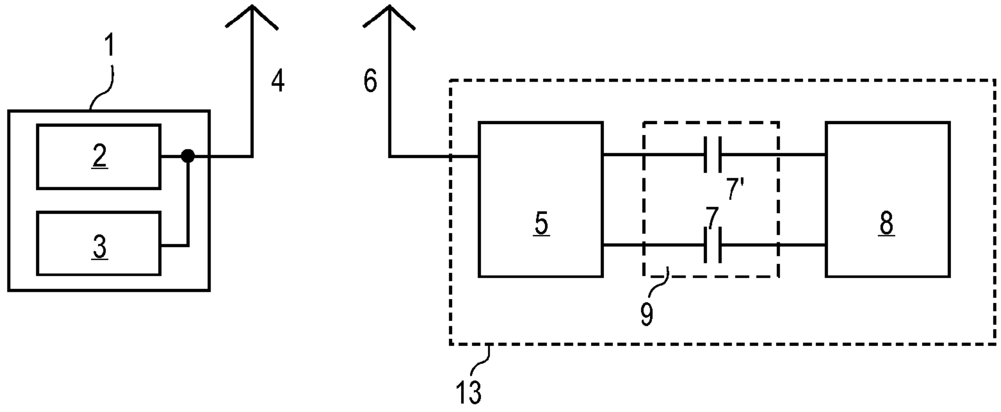
FIG. 1 is a block circuit diagram of a first example of the linking of a sensor element (8) with a transponder through capacitive coupling.

According to FIG. 1 a sensor element is wirelessly linked with a transponder 5; i.e., the sensor element 8 and the transponder 5 are not wired together. The output of the sensor element 8 is instead capacitively coupled with the input of the transponder 5 via a coupling capacitor 7,7'. The sensor element 8 can be designed as an ohmic resistor, a capacitor, or an inductor depending on the measured value.

The transponder 5 is connected via an antenna 6 to an antenna 4 of a separate write/read device 1, which comprises a transmitter 2 and a receiver 3. Measurement data from the sensor element 8 can be read wirelessly by the write/read device 1. The write/read device 1 is stationary, whereas the sensor element 8 and the transponder 5 are situated on equipment being monitored 13.

In the example represented, the sensor element 8 and the transponder 5 are separated by a membrane 9 or other electrically nonconductive material. The membrane 9 or other nonconductive material forms a dielectric between the plates of the coupling capacitor 7, which influences the coupling capacities.

This configuration occurs when the sensor element 8 is placed inside a body such as an airplane tire. In order to measure temperature, deformation, or other physical parameters using suitable sensor elements in the tire carcass, one plate of the coupling capacitor 7 is arranged on the inside of the tire, and the other plate is fully integrated into the tire material at a defined distance from the first. The sealing inner layer of the tire remains undamaged. This is very important owing to the butyl layer that is applied here, because this is a critical determinant of the density of the tire. The tire material between the capacitor plates forms the dielectric of the coupling capacitor 7.

In this example, the write/read device 1 is arranged in a vehicle, and the measurement data for the tire can be transmitted to an on-board computer or similar device during travel.

Figure 2:
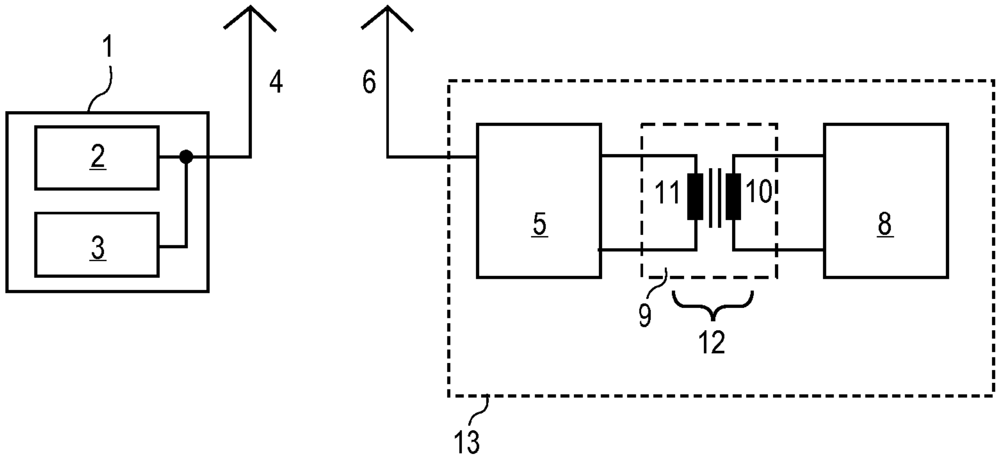
FIG. 2 is a block circuit diagram of a second example comprising inductive coupling.

FIG. 2 represents an application in which the wireless linking of the sensor element 8 and the transponder 5 is achieved through inductive coupling 12. Two coils 10, 11 are magnetically coupled with the aid of the constructional elements of the equipment being monitored. If the configuration is used in a tire, one of the coils 10 is situated inside the tire, and the other coil 11 is integrated into the tire material. The second coil can be formed at least partly by a steel belt.

For measurement purposes, any arbitrary physical quantity can be used; in other words, the concrete embodiment of the element which senses the measurement value is not determinative and generally depends on which parameters are sought. Possible embodiments of the sensor element 8 include capacitors, inductors, and ohmic resistors whose value depends on the respective measurement.

The invention claimed is:

1. A sensor system, comprising:

a sensor element for measuring a physical parameter;

a transponder for transmitting the measured physical parameter to a read device; and a capacitive coupling, including a first pair of plates connected to the sensor and a second pair of plates connected to the transponder, for wirelessly linking the sensor element to the transponder, the first and second pair of plates separated by a fixed distance.

2. The system according to claim 1, further comprising a separating layer disposed between the sensor element and the transponder, wherein the sensor element is linked with the transponder without mechanically penetrating the separating layer.

3. The system according to claim 1, further comprising a mechanical separating layer that forms a dielectric for the capacitive coupling.

4. A configuration for linking a sensor element with a transponder, wherein the transponder is linked with the sensor element through inductive coupling, and the transponder and the sensor element are fastened to each other in a nonmovable relationship to each other.

5. Configuration according to claim 4, wherein a capacitor whose value depends on a respective measurement is used as the sensor element.

6. Configuration according to claim 4, wherein an inductor whose value depends on a respective measurement is used as the sensor element.

7. Configuration according to claim 4, wherein an ohmic resistor whose value depends on a respective measurement is used as the sensor element.

8. Configuration according to claim 4, further comprising a separating layer disposed between the sensor element and the transponder, wherein the sensor element is linked with the transponder without mechanically penetrating the separating layer.

9. Configuration according to claim 4, further comprising a separating layer, wherein measurement data are registered by:

at least two sensor elements disposed on opposite sides of the separating layer, at least one sensor element disposed at a surface of the separating layer, or at least one sensor element disposed within an interior of the separating layer.

10. Configuration according to claim 4, wherein measurement data are registered by at least one sensor element disposed within an interior of a container that is at least partly filled with gas or fluid.

11. Configuration according to claim 4, wherein measurement data are registered by at least one sensor element disposed within an interior of a wheel that is at least partly filled with gas or fluid.

12. Configuration according to claim 4, wherein measurement data are registered by at least one sensor element disposed on a surface, or within an interior, of a tire.

13. Configuration according to claim 4, further comprising an electric conductor loop, disposed between the sensor element and the transponder, to provide the inductive coupling.

14. Configuration according to claim 13, wherein the electric conductor loop is disposed within a structural element of a monitored device.

15. Configuration according to claim 14, wherein the structural element is a tire and the electric conductor loop is a steel belt of the tire.

16. Configuration according to claim 14, wherein the structural element is a tire and the electric conductor loop is vulcanized into the tire.

* * * * *